United States Patent
Hasegawa et al.

(10) Patent No.: US 8,304,683 B2
(45) Date of Patent: Nov. 6, 2012

(54) SEAM WELDING APPARATUS AND SEAM WELDING METHOD

(75) Inventors: Eisaku Hasegawa, Kanuma (JP); Shogo Matsuda, Utsunomiya (JP); Takafumi Ikeda, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 12/823,594

(22) Filed: Jun. 25, 2010

(65) Prior Publication Data

US 2010/0326965 A1    Dec. 30, 2010

(30) Foreign Application Priority Data

Jun. 26, 2009  (JP) ................. 2009-152159

(51) Int. Cl.
*B23K 11/00* (2006.01)
(52) U.S. Cl. .......... 219/117.1; 219/56; 219/64; 219/67; 219/78.02; 219/79; 219/114; 219/115; 219/118
(58) Field of Classification Search .......... 219/56, 219/64, 67, 78.02, 79, 83, 114, 115, 117.1, 219/118
See application file for complete search history.

(56) References Cited

U.S. PATENT DOCUMENTS

| | | | | |
|---|---|---|---|---|
| 4,532,399 | A | * | 7/1985 | Jones ................ 219/117.1 |
| RE32,251 | E | * | 9/1986 | Matsuno et al. ........... 219/64 |
| 4,661,673 | A | * | 4/1987 | Geiermann .............. 219/64 |
| 5,796,065 | A | * | 8/1998 | Fujiyoshi et al. ........ 219/78.02 |

FOREIGN PATENT DOCUMENTS

| | | |
|---|---|---|
| CN | 1161264 | 10/1997 |
| EP | 1514629 A1 | 3/2005 |
| JP | 04-294871 | 10/1992 |
| JP | 2006-088166 | 4/2006 |
| JP | 2006-192482 | 7/2006 |
| WO | 03/103884 A1 | 12/2003 |

* cited by examiner

*Primary Examiner* — Michael Lebentritt
(74) *Attorney, Agent, or Firm* — Rankin, Hill & Clark LLP

(57) ABSTRACT

A seam welding apparatus and a seam welding method perform a seaming process on workpieces of various shapes having flange sections, by preventing a welding track formed by upper and lower rotary electrodes from becoming displaced from a welding reference line established on the flange section. The seam welding apparatus includes two rotary electrodes for gripping the flange section therebetween while seam-welding the flange section, a support for synchronizing movements of the two rotary electrodes with each other in a widthwise direction of the flange section, a turning mechanism for pressing at least one of the two rotary electrodes toward the workpiece body, a roller that abuts against an end face of the flange section, and roller adjusting means for positionally adjusting the roller.

9 Claims, 12 Drawing Sheets

SEAM WELDING APPARATUS AND SEAM WELDING METHOD

CROSS-REFERENCE TO RELATED APPLICATION

This application is based upon and claims the benefit of priority from Japanese Patent Application No. 2009-152159 filed on Jun. 26, 2009, of which the contents are incorporated herein by reference.

BACKGROUND OF THE INVENTION

1. Field of the Invention

The present invention relates to a seam welding apparatus and a seam welding method for welding a workpiece while the workpiece is fed between a pair of electrode rolls.

2. Description of the Related Art

Fuel tanks for use on motor vehicles or the like, for example, are manufactured by superposing outer peripheral ends of two members that have been pressed into a given shape, and then welding the superposed outer peripheral ends. The welded outer peripheral ends may have a two-dimensional or three-dimensional curved shape.

A seam welding method according to the related art employs an automatic copying apparatus, as disclosed in Japanese Laid-Open Patent Publication No. 04-294871. The automatic copying apparatus comprises a rotary table supported rotatably in horizontal directions, a workpiece rest supported on the rotary table for securing a workpiece thereto, a web-like copying cam mounted on the lower surface of the rotary table, which approximates a welding reference line of a flange section (including straight flanges and corner flanges) of a workpiece secured to the workpiece rest, and a pair of guide rollers for gripping the copying cam on both sides thereof at a position below upper and lower rotary electrodes on an electrode pressing central line. When the rotary table is rotated, a pressing point of the upper and lower rotary electrodes moves relatively along the welding reference line of the flange section.

According to the seam welding method disclosed in Japanese Laid-Open Patent Publication No. 04-294871, when welding conditions are changed, e.g., when the welding rate (the rotational speed of the rotary table) is increased, a track that is followed by the actual pressing point of the upper and lower rotary electrodes, i.e., the welded track, tends to vary. As a result, the upper and lower rotary electrodes may become displaced (derailed) from the workpiece, or may bite into the main body of the workpiece, which greatly impairs product quality.

One solution to the above problem would be to bring the welded track into conformity with the welding reference line. However, this solution is time-consuming and requires a large number of workpieces to be consumed on a trial basis, because it is necessary to repeat a process of establishing a welding reference line on the basis of CAD data, a process of fabricating a copying cam based on the established welding reference line, and a process of carrying out seam welding under various welding conditions.

The above difficulty has also been experienced by a seam welding process for seam-welding a workpiece while the workpiece is moved along an established path by a six-axis robot, as well as by a seam welding process using a copying cam.

SUMMARY OF THE INVENTION

It is an object of the present invention to provide a seam welding apparatus and a seam welding method for performing a high-quality seaming process on workpieces of various shapes having flange sections, by preventing a welding track formed by upper and lower rotary electrodes from becoming displaced from a welding reference line established on the flange section.

According to a first aspect of the present invention, there is provided a seam welding apparatus for welding a flange section that extends around a workpiece body of a workpiece, comprising two rotary electrodes for gripping the flange section therebetween while seam-welding the flange section, a support for synchronizing movements of the two rotary electrodes with each other in a widthwise direction of the flange section, electrode pressing means for pressing at least one of the two rotary electrodes toward the workpiece body, a roller that abuts against an end face of the flange section, and roller adjusting means for positionally adjusting the roller.

Since the support synchronizes movements of the two rotary electrodes with each other in a widthwise direction of the flange section, the point of contact between one of the rotary electrodes and the flange section and the point of contact between the other rotary electrode and the flange section are kept in alignment with each other. Therefore, the flange section can be welded reliably while the flange section is securely gripped by the rotary electrodes.

Furthermore, since the electrode pressing means presses at least one of the two rotary electrodes toward the workpiece body, the welded track formed by the two rotary electrodes does not deviate from a preset welding reference line. Stated otherwise, the welded track does not move away from the welding reference line toward the end face of the flange section, and the welded track does not become displaced (derailed) away from the flange section.

Moreover, since the roller abuts against the end face of the flange section and the roller adjusting means positionally adjusts the roller, the distance from the end face of the flange section to the welded track is made substantially constant depending on the shape of the flange section, e.g., depending on a straight portion of the flange section where the end face of the flange section extends straightly, and a corner of the flange section where the end face is curved. Alternatively, the distance from the end face of the flange section to the welded track can be made substantially constant irrespective of the straight portion and the corner of the flange section. Such a distance, which is made substantially constant depending on the shape of the flange section, refers to a distance from the end face of the flange section to the welded track, which is brought substantially into conformity with a preset distance for the straight portion, as well as to a distance from the end face of the flange section to the welded track, which is brought substantially into conformity with a preset distance for the corner. Since at least one of the rotary electrodes is pressed toward the workpiece body, the end face of the flange section is held relatively in abutment against the roller at all times. Consequently, the present position of the roller can easily be recognized, or in other words, the present position of the roller can easily be regarded as the position of the end face of the flange section. Thus, it is easy for the roller adjusting means to adjust the position of the roller. The rotary electrodes also are prevented from biting into the workpiece body.

According to the first aspect of the present invention, therefore, the welded track formed by the two rotary electrodes can be made substantially constant, depending on or irrespective of the shape of the flange section, and the flange section can reliably be seam-welded along the preset welding reference line. Therefore, it is not necessary to seam-weld a number of workpieces on a trial basis for the purpose of bringing the welded track into alignment with the welding reference line.

Rather, the workpiece can simply be seam-welded based on teaching data, which are established geometrically by a three-dimensional CAD system, for example.

In the above seam welding apparatus, the electrode pressing means may press the rotary electrodes to bring leading ends of the rotary electrodes closer to the workpiece body with respect to a direction in which the rotary electrodes travel on the flange section, thereby inclining the direction in which the rotary electrodes travel with respect to a direction along which the flange section is welded. The electrode pressing means may turn the rotary electrodes about a line normal to the portion of the flange section where the rotary electrodes contact the flange section. Therefore, the electrode pressing means may be constituted by a simple mechanism.

The direction along which the flange section is welded and the direction in which the rotary electrodes travel should preferably be angularly spaced from each other by an angle ($\theta$) greater than 0° but equal to or smaller than 10°. If the angle is too large, the rotary electrodes are prevented from rotating and tend to slip on the flange section while traveling therealong, thereby resulting in a reduction in welding quality.

The roller adjusting means may comprise a movable shaft mounted on the support, the roller being mounted on a distal end of the movable shaft, and a controller for controlling a distance that the movable shaft is extended or contracted. By controlling the distance that the movable shaft is extended or contracted, the distance from the end face of the flange section to the welded track can be made substantially constant, depending on or irrespective of the shape of the flange section. The movable shaft preferably comprises a pneumatic cylinder, a liquid-pressure cylinder (including a hydraulic cylinder), a feed screw mechanism, or the like.

Alternatively, the roller adjusting means may comprise a movable shaft mounted on the support by resilient members, and which is movable along a direction in which the two rotary electrodes are arrayed, the roller being mounted on a distal end of the movable shaft, and a controller for controlling a distance that the movable shaft is extended or contracted. With this arrangement, even if the flange section has a vertically meandering shape, the roller can follow the vertically meandering shape of the flange section while the flange section is seam-welded. Therefore, the flange section, which may be of a complex shape, can be seam-welded satisfactorily.

Alternatively, the roller adjusting means may comprise a movable shaft supported on an arm member disposed between at least one of the two rotary electrodes and the support, the roller being mounted on a distal end of the movable shaft, and a controller for controlling a distance that the movable shaft is extended or contracted. With this arrangement, the maximum stroke of the movable shaft can be made small regardless of the length from the rotary electrode to the support. Therefore, the roller adjusting means can be reduced in size.

According to a second aspect of the present invention, there is provided a seam welding method for welding a flange section that extends around a workpiece body of a workpiece while the flange section is gripped between two rotary electrodes, the method comprising the steps of synchronizing the two rotary electrodes with each other for movement in a widthwise direction of the flange section, and seam-welding the flange section while pressing at least one of the two rotary electrodes toward the workpiece body and holding a roller in abutment against an end face of the flange section.

The seam welding method may further comprise a step of pressing the rotary electrodes to bring leading ends of the rotary electrodes closer to the workpiece body with respect to a direction in which the rotary electrodes travel on the flange section, thereby inclining the direction in which the rotary electrodes travel with respect to a direction along which the flange section is welded.

The direction along which the flange section is welded and the direction in which the rotary electrodes travel should preferably be angularly spaced from each other by an angle ($\theta$) greater than 0° but equal to or smaller than 10°.

As described above, the seam welding apparatus and the seam welding method according to the present invention enable a high-quality seaming process to be performed on workpieces of various shapes having flange sections, by preventing a welding track formed by upper and lower rotary electrodes from becoming displaced from a welding reference line established on the flange section.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A seam welding apparatus and a seam welding method according to a preferred embodiment of the present invention will be described in detail below with reference to FIGS. 1 through 12.

Figure 1:
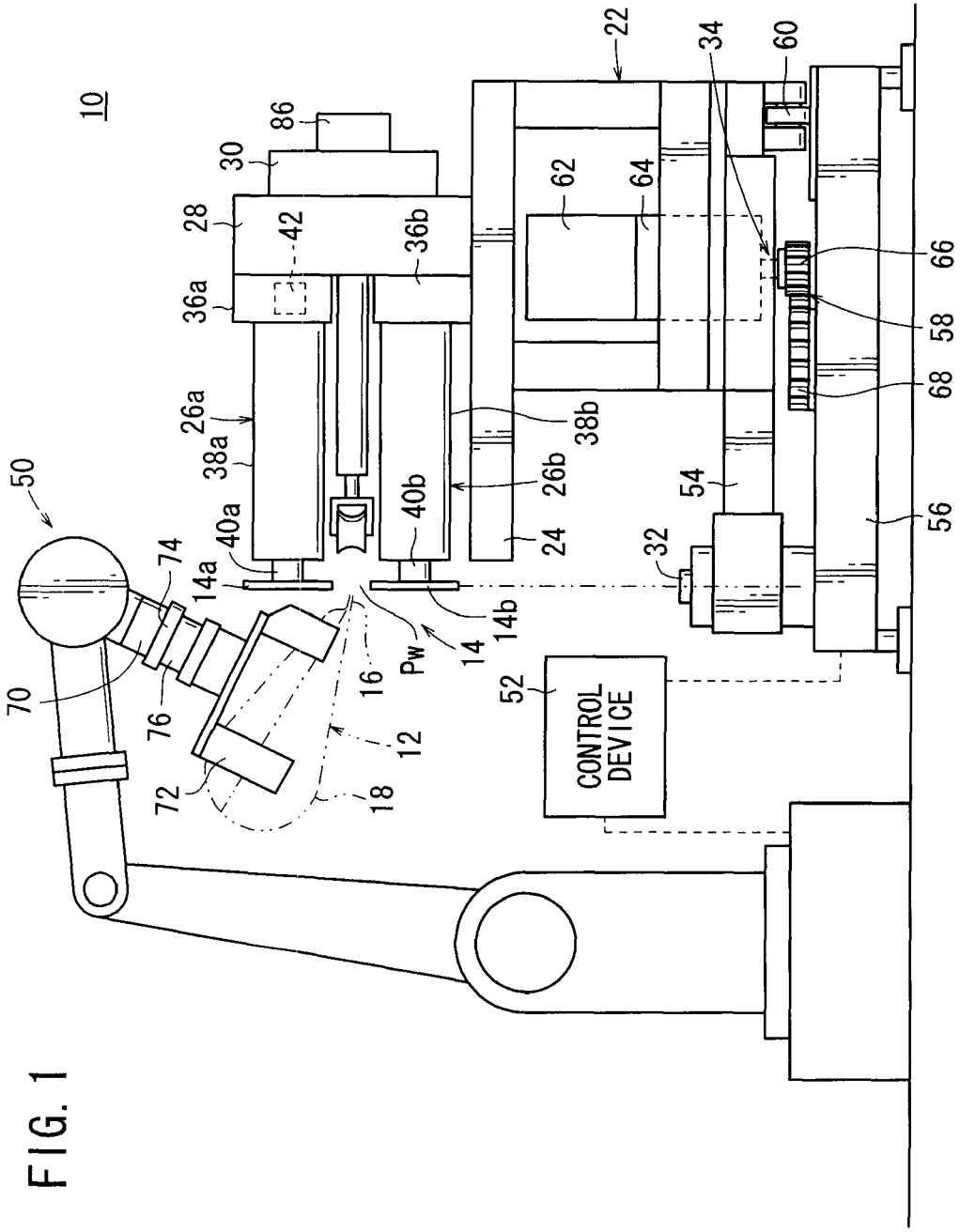
FIG. 1 is a front elevational view of a seam welding apparatus according to an embodiment of the present invention.

FIG. 1 shows in front elevation a seam welding apparatus 10 according to an embodiment of the present invention. The seam welding apparatus 10 serves to resistance-weld a workpiece 12, which comprises two superposed pressed members (metal members), while the workpiece 12 is fed between a pair of electrode rolls, i.e., an upper electrode roll 14a and a lower electrode roll 14b (rotary electrodes).

An example of the workpiece 12 that is welded by the seam welding apparatus 10 will be described below.

Figure 2:
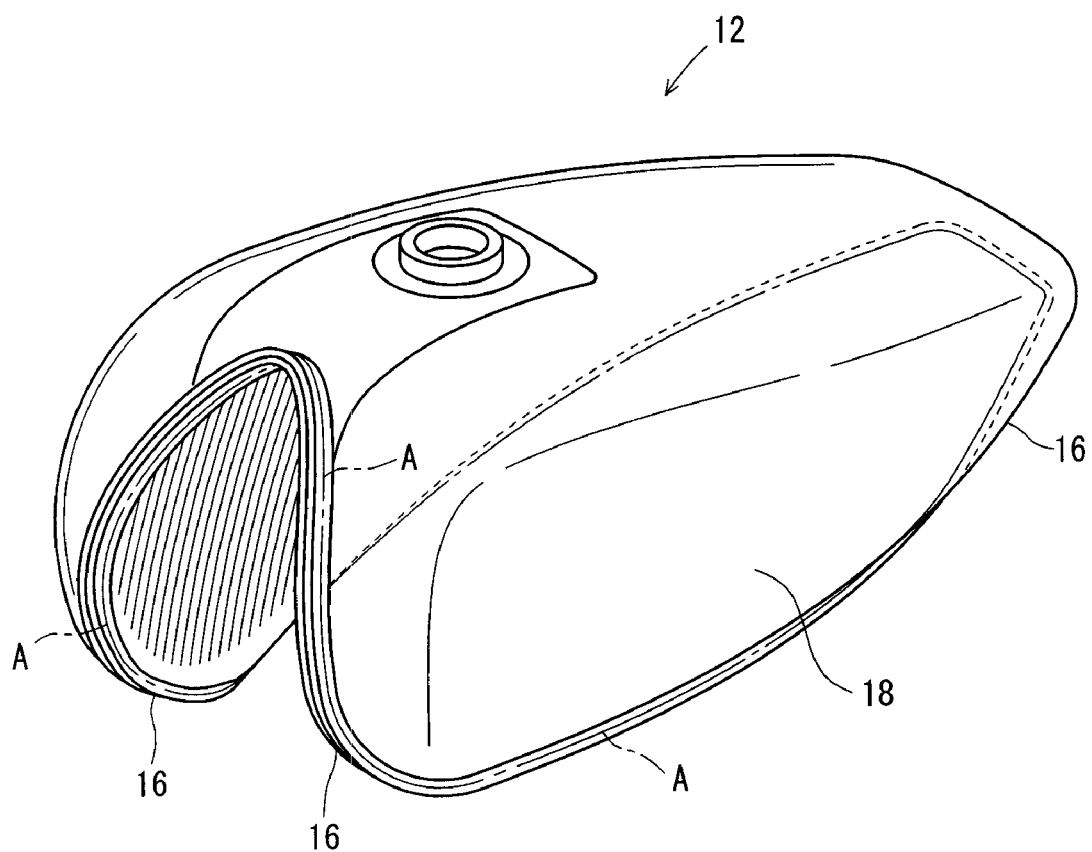
FIG. 2 is a perspective view of an example of a workpiece that is welded by the seam welding apparatus shown in FIG. 1.

As shown in FIG. 2, the workpiece 12 is used as a motorcycle fuel tank, and comprises two workpiece bodies 18 having respective flange sections 16, which extend therearound and are superposed on each other. The superposed flange sections 16 may also be referred to collectively as a flange section 16, whereas the combined workpiece bodies 18 may be referred to collectively as a workpiece body 18. A welding reference line A (refer to the dot-and-dash line), which is referred to as a reference for seam-welding the flange section 16, is established on the flange section 16. Information concerning the welding reference line A and information concerning the end face of the flange section 16 are established by means of a three-dimensional CAD system. More specifically, a number of vertex data with respect to the end face of the flange section 16 and a number of vertex data with respect to the welding reference line A are associated with each other, and such vertex data are arrayed as map information, which is stored in a memory, not shown. The workpiece 12 to be welded by the seam welding apparatus 10 may alternatively comprise a fuel tank for use on other vehicles, such as four-wheeled vehicles. The workpiece may also comprise a can, an electric device, or any of various industrial products.

As shown in FIG. 1, the seam welding apparatus 10 comprises a main body 22 constructed from a plurality of frames, upper and lower electrode mechanisms 26a, 26b mounted on a table 24 of the main body 22 and including the upper electrode roll (rotary electrode) 14a and the lower electrode roll (rotary electrode) 14b, respectively, a support 28 by which the upper and lower electrode mechanisms 26a, 26b are supported on the table 24, an electrode controller 30 for controlling the upper and lower electrode mechanisms 26a, 26b, etc., and a turning mechanism 34 (electrode pressing means; see FIG. 3) for turning the main body 22 within an angular range of about 90 degrees about a support post 32 along a horizontal plane.

The upper electrode mechanism 26a comprises an upper electrode drive unit 36a for vertically moving and rotating the upper electrode roll 14a in accordance with commands from the electrode controller 30, a first arm member 38a by which the upper electrode roll 14a is supported on the upper electrode drive unit 36a in a cantilevered fashion, and a first drive shaft 40a axially mounted centrally on the first electrode drive unit 36a to the upper electrode roll 14a.

Similarly, the lower electrode mechanism 26b comprises a lower electrode drive unit 36b for vertically moving and rotating the lower electrode roll 14b in accordance with commands from the electrode controller 30, a second arm member 38b by which the lower electrode roll 14b is supported on the lower electrode drive unit 36b in a cantilevered fashion, and a second drive shaft 40b axially mounted centrally on the second arm member 38b for transmitting drive power from the lower electrode drive unit 36b to the lower electrode roll 14b.

When the upper electrode roll 14a and the lower electrode roll 14b are actuated to move toward each other, they press the flange section 16 of the workpiece 12, so that the flange section 16 becomes gripped by the upper electrode roll 14a and the lower electrode roll 14b. Pressure applied by the upper electrode roll 14a and the lower electrode roll 14b to the flange section 16 can be adjusted by a command from the electrode controller 30. In particular, since the upper electrode mechanism 26a and the lower electrode mechanism 26b are supported on the table 24 by the support 28, the upper electrode mechanism 26a and the lower electrode mechanism 26b can be moved in synchronism with each other relatively to the flange section 16 of the workpiece 12, e.g., in a widthwise direction of the flange section 16, or in a direction from the end faces of the flange section 16 toward the workpiece body 18. The upper electrode drive unit 36a and the lower electrode drive unit 36b may include respective actuators, each having a cylinder and a piston. Alternatively, the upper electrode drive unit 36a and the lower electrode drive unit 36b may include respective actuators having a piezoelectric device for vertically moving the upper electrode roll 14a and the lower electrode drive unit 36b, and may also include respective motors such as servomotors for rotating the upper electrode roll 14a and the lower electrode drive unit 36b. The upper electrode mechanism 26a includes an angle sensor 42 for detecting angular displacement of the upper electrode roll 14a in order to detect the distance by which the flange section 16 is fed.

The seam welding apparatus 10 also includes a robot 50 for holding and feeding the workpiece 12 between the upper electrode roll 14a and the lower electrode roll 14b, and a control device 52 serving as a controller for controlling the apparatus including the robot 50 in its entirety. The upper electrode roll 14a and the lower electrode roll 14b shall hereinafter be shown and described collectively as electrode rolls 14.

The turning mechanism 34 comprises a support plate 54 supporting the main body 22 thereon, the support post 32 rotatably mounted on the support plate 54, a base 56 spaced downwardly from the support plate 54 and supporting the support post 32, a turning assembly 58 for turning the support plate 54 horizontally through a predetermined angle about an axis of the support post 32, which is referred to as a turning center axis O, and a plurality of rollers 60 rotatably mounted on the bottom of the support plate 54 and which undergo rolling movement on the base 56 when the support plate 54 is turned by the turning assembly 58.

The turning assembly 58 comprises a turning motor 62 fixedly mounted on the support plate 54, a speed reducer 64 combined with the turning motor 62, a pinion 66 coupled to the motor shaft of the turning motor 62, and an arcuate rack 68 fixed to the base 56 and which is held in mesh with the pinion 66. The turning motor 62 may comprise a servomotor, for example.

Figure 3:
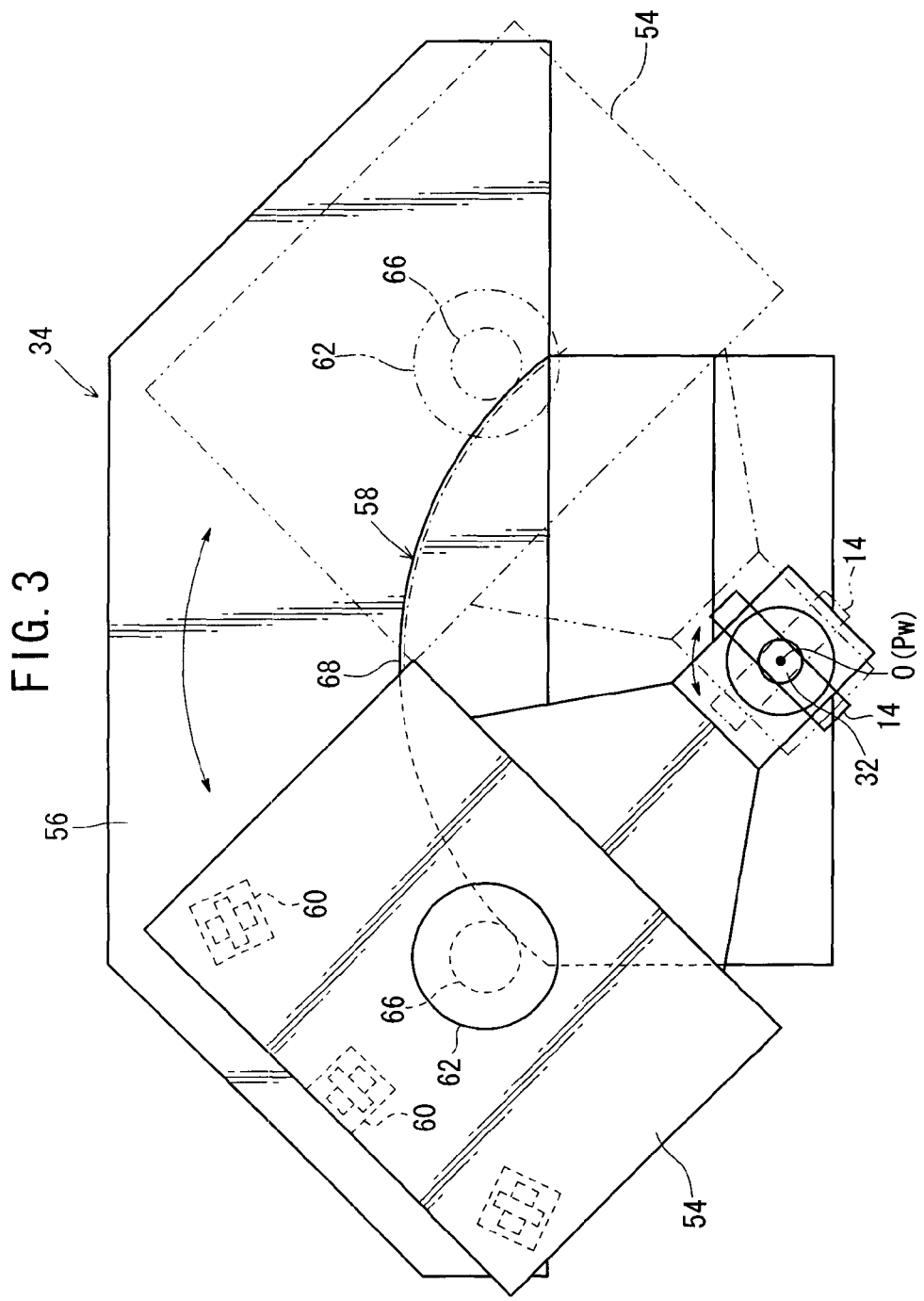
FIG. 3 is a plan view showing the manner in which a turning mechanism is actuated in order to turn electrode rolls and a support table through a predetermined angle.

When the turning motor 62 is energized by a power supply (not shown) electrically connected thereto, the pinion 66 is rotated in a certain direction about its axis, thereby causing the pinion 66 and the rack 68 held in mesh therewith to turn the support plate 54 about the support post 32 within an angular range of about 90 degrees along a horizontal plane (see FIG. 3). The turning center axis O extends through a weld point Pw (pressing point) on the flange section 16 of the workpiece 12, which is fed between the electrode rolls 14. Therefore, the upper electrode roll 14a and the lower electrode roll 14b are moved angularly in unison with the support plate 54 within an angular range of about 90 degrees about the weld point Pw (see FIGS. 1 and 3). The weld point Pw on the flange section 16 of the workpiece 12, which is gripped between the electrode rolls 14 and welded thereby, is held in vertical alignment with the turning center axis O of the support post 32 (see FIG. 1).

Figure 4:
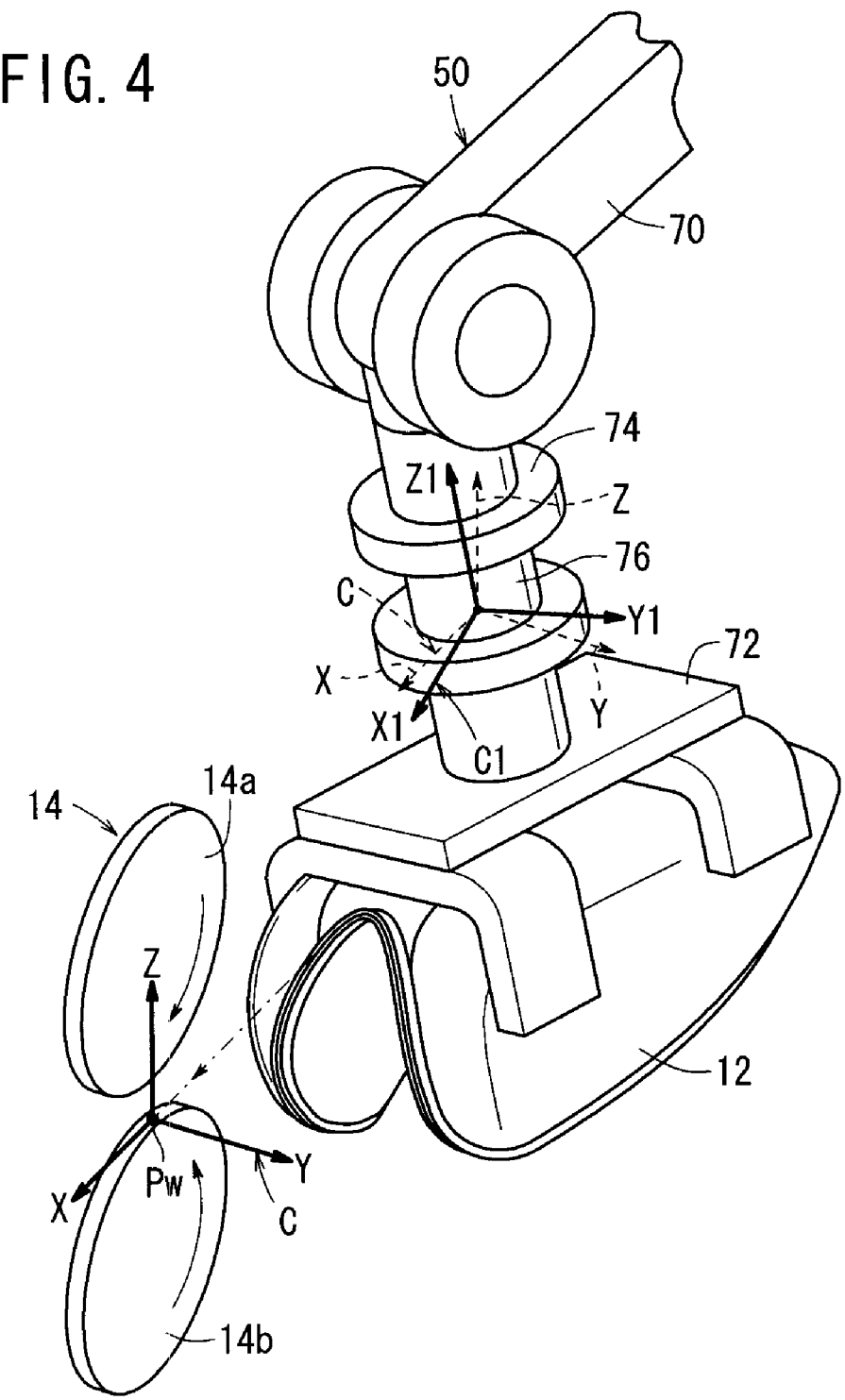
FIG. 4 is a fragmentary perspective view showing the manner in which a workpiece held by a robot is seam-welded, while the workpiece is fed between electrode rolls.

FIG. 4 shows in fragmentary perspective the manner in which the workpiece 12, while being held by the robot 50, is seam-welded while the workpiece 12 is fed between the electrode rolls 14.

As shown in FIGS. 1 and 4, the robot 50 comprises a known industrial multiple-joint robot, which is program-operated. The robot 50 can hold the workpiece 12 with a workpiece holding jig 72 mounted on the tip end of an arm 70, and can move the workpiece 12 to a desired position and a desired attitude. The workpiece holding jig 72 is coupled to a flange 74 on the tip end of the arm 70, with a load cell 76 interposed therebetween.

The load cell 76 comprises a known six-axis (six-component-force) load cell, including a plurality of strain gages fixed to a load bearing member in a flat hollow cylindrical container, not shown. The load cell 76 can detect forces along three axes, including an X1-axis, a Y1-axis, and a Z1-axis of a load cell coordinate system C1 as an orthogonal coordinate system, and three moments about the three axes (the forces and moments also are referred to as "six-axis data") (see FIG. 4).

In FIG. 4, there also is shown a reference coordinate system C that forms another orthogonal coordinate system, having a Z-axis (Z direction) along which the electrode rolls 14 press the workpiece 12 at the weld point Pw thereon, an X-axis (X direction) along which the robot 50 feeds the workpiece 12 at the weld point Pw, and a Y-axis (Y direction) that extends perpendicularly to the Z-axis and the X-axis.

Under control of the control device 52, according to preset teaching data, the robot 50 is operated to feed the workpiece 12 in the X direction at the weld point Pw at all times. While the robot 50 is in operation, the reference coordinate system C is fixed, whereas the load cell coordinate system C1 is rotated depending on the operating angle of the arm 70 of the robot 50. Therefore, respective axes of the reference coordinate system C and the load cell coordinate system C1 are displaced from each other while the seam welding apparatus 10 performs a normal welding operation (see FIG. 4).

Figure 5A:
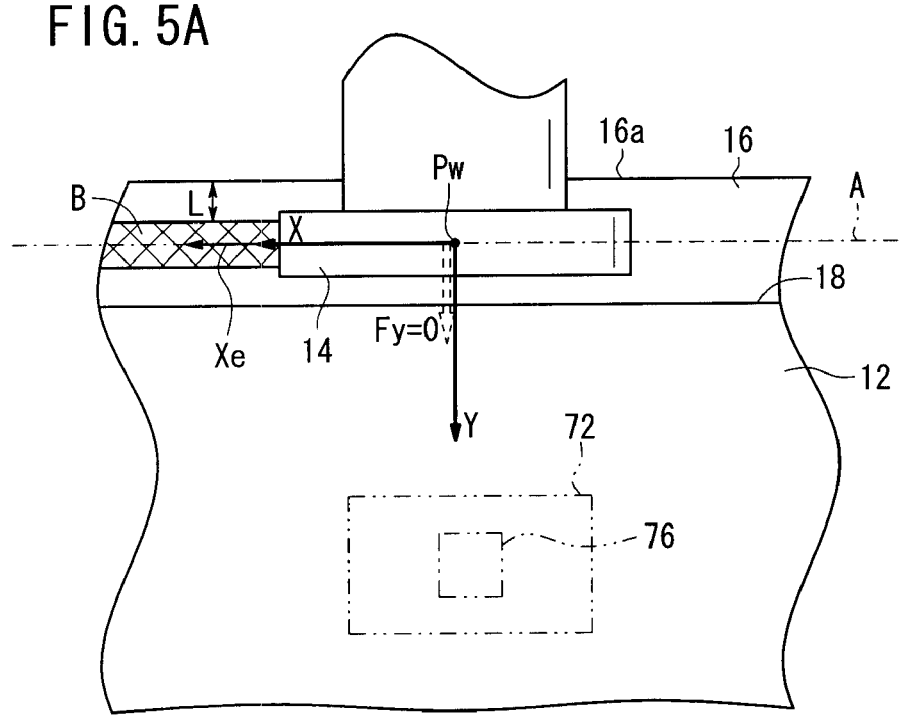
FIG. 5A is a fragmentary plan view showing the manner in which a workpiece is seam-welded while electrode rolls travel in a direction aligned with the direction of a welding reference line.

For performing a seam welding process on the flange section 16 of the workpiece 12, as shown in FIG. 5A, the X direction along which the robot 50 feeds the workpiece 12 at the weld point Pw may be kept in alignment with an Xe direction along which the rotating electrode rolls 14 feed the workpiece 12. In this case, a Y-direction load Fy imposed as a force along the Y direction is 0 (zero) (see the broken-line arrow in FIG. 5A). A portion of the flange section 16, which has been welded by the electrode rolls 14, is referred to as a welded track B. In order to improve welding quality, it is preferable that the distance L from an end face 16a of the flange section 16 to the welded track B be substantially constant.

Figure 5B:
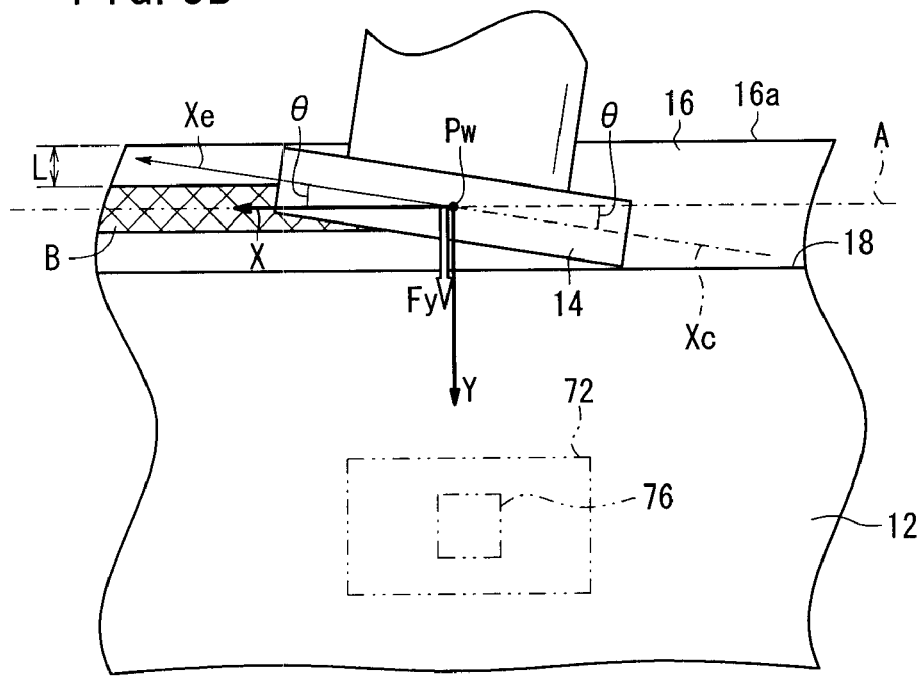
FIG. 5B is a fragmentary plan view showing the manner in which a workpiece is seam-welded while electrode rolls travel in a direction inclined to the direction of a welding reference line.

According to the present embodiment, as shown in FIG. 5B, the X direction along which the robot 50 feeds the workpiece 12 at the weld point Pw and the Xe direction along which the rotating electrode rolls 14 feed the workpiece 12 are intentionally and positively held out of alignment with each other. That is, the electrode rolls 14 are pressed toward the workpiece body 18 to tilt the Xe direction along which the rotating electrode rolls 14 feed the workpiece 12 with respect to the X direction along which the robot 50 feeds the workpiece 12 at the weld point Pw. More specifically, as shown in FIGS. 1 and 4, the turning mechanism 34 turns the main body 22 about the support post 32 in order to keep the X direction and the Xe direction angularly spaced from each other by an angle θ, which is greater than 0° but equal to or smaller than 10°. The electrode rolls 14 are pressed such that leading ends thereof are displaced closer to the workpiece body 18 with respect to the Xc direction (refer to the dot-and-dash line in FIG. 5B) in which the electrode rolls 14 travel. Thus, the Xc direction along which the electrode rolls 14 travel is inclined with respect to the direction along which the flange section 16 is welded (the direction of the welding reference line A). In this case, the turning mechanism 34 turns the main body 22 about the support post 32 in order to make the angle θ between the direction of the welding reference line A and the Xc direction greater than 0° but equal to or smaller than 10°.

To make the angle θ greater than 0° but equal to or smaller than 10°, as shown in FIG. 5B, the Xc direction is inclined to the welding reference line A in order to bring the leading ends of the electrode rolls 14 closer to the workpiece body 18. At this time, the Y-direction load Fy is detected as a positive load, e.g., +0.2 kN. Since the Y-direction load Fy changes depending on the angle θ, a range (allowable range) for the Y-direction load Fy is preset to satisfy the angle θ, which is greater than 0° but equal to or smaller than 10°, and the turning mechanism 34 is controlled to maintain the Y-direction load Fy detected by the load cell 76 within the allowable range. If the angle θ is too large, then the electrode rolls 14 are prevented from rotating and tend to slip on the flange section 16 while traveling thereon, resulting in a reduction in welding quality.

Figure 6:
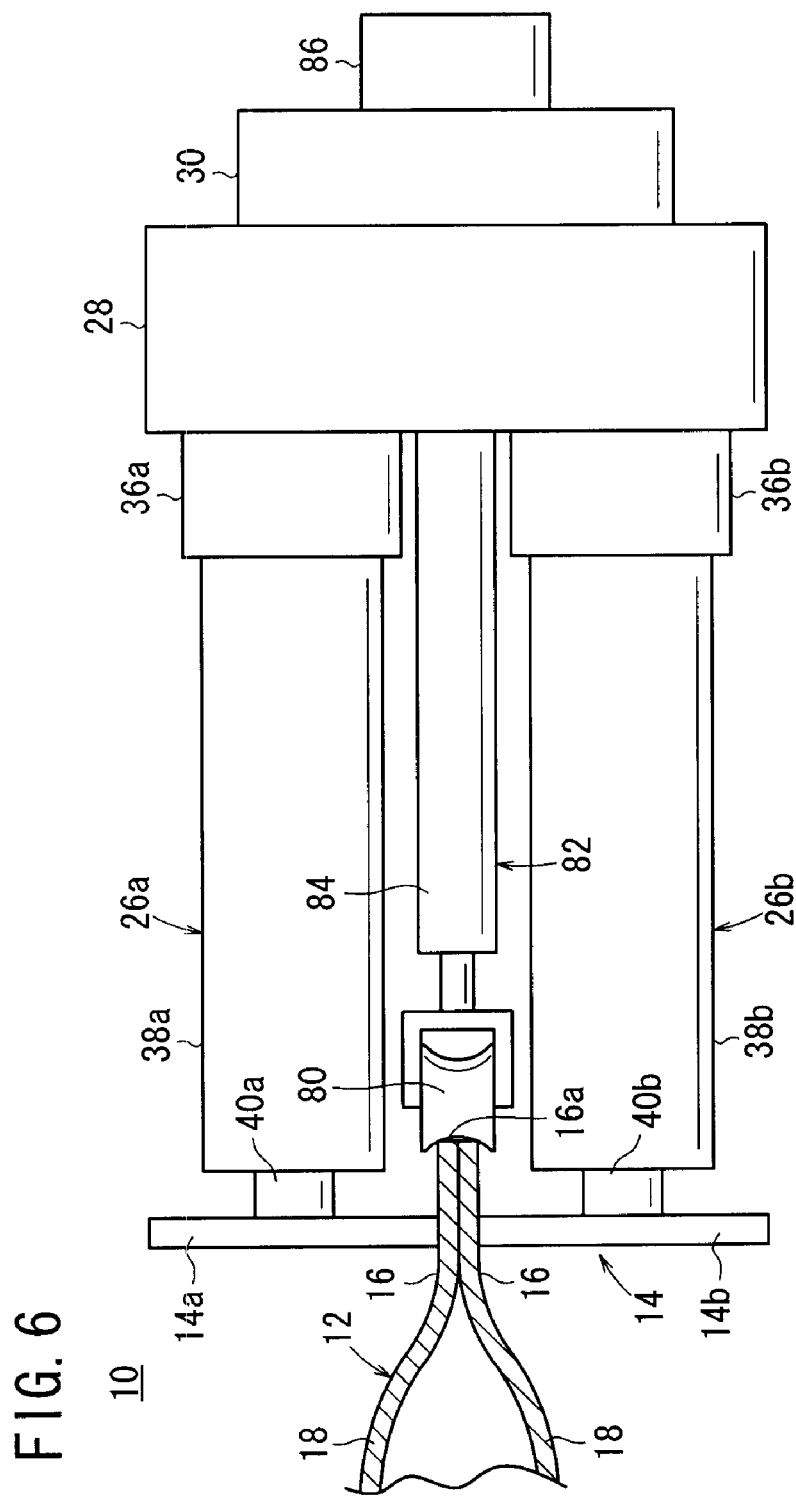
FIG. 6 is a front elevational view, partially omitted from illustration, showing the manner in which a workpiece is welded, while a flange section of the workpiece is gripped between electrode rolls.

According to the present embodiment, as shown in FIGS. 1 and 6, the seam welding apparatus 10 also includes a roller 80, which abuts against the end face 16a of the flange section 16 of the workpiece 12, and a roller adjusting means 82 for adjusting the position of the roller 80.

The roller 80 is in the shape of a bobbin, which is generally cylindrical. The roller 80 has a circumferential surface, which is smoothly concave along its axis between axially opposite end faces thereof, having an axially central diameter smaller than the diameters of the axially opposite end faces. Therefore, the end face 16a of the flange section 16 of the workpiece 12 can easily be held in abutment against an axially central region of the roller 80.

The roller adjusting means 82 includes a movable shaft 84, having a proximal end thereof mounted on the support 28 and a distal end on which the roller 80 is rotatably mounted, and a roller controller 86 (controller) disposed on the electrode controller 30, for controlling the distance that the movable shaft 84 moves axially, i.e., the distance by which the movable shaft 84 is extended or contracted. The movable shaft 84 preferably comprises a pneumatic cylinder, a liquid-pressure cylinder (including a hydraulic cylinder), a feed screw mechanism, or the like. When the movable shaft 84 moves axially, the movable shaft 84 can displace the end face 16a of the flange section 16 in axial directions of the movable shaft 84, thereby changing the distance L from the end face 16a of the flange section 16 to the welded track B. In other words, the distance L from the end face 16a of the flange section 16 to the welded track B can be maintained substantially constant by controlling the distance by which the movable shaft 84 is extended or contracted. This distance, which is substantially constant, refers to a distance that deviates from a preset distance by a range of 1.5 or smaller for 3σ.

Figure 9:
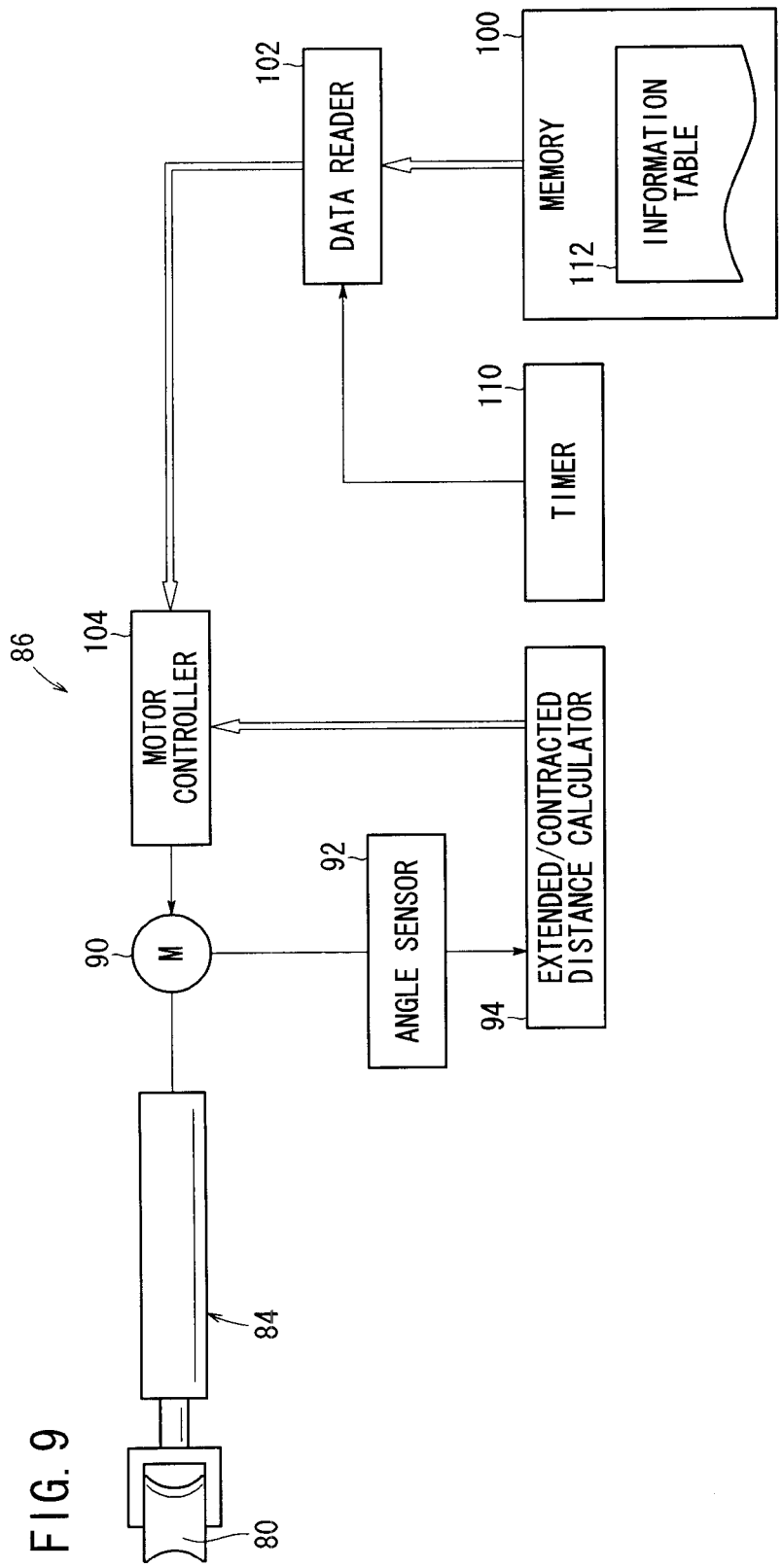
FIG. 9 is a block diagram of a roller controller for controlling the speed of a roller.
Figure 10:
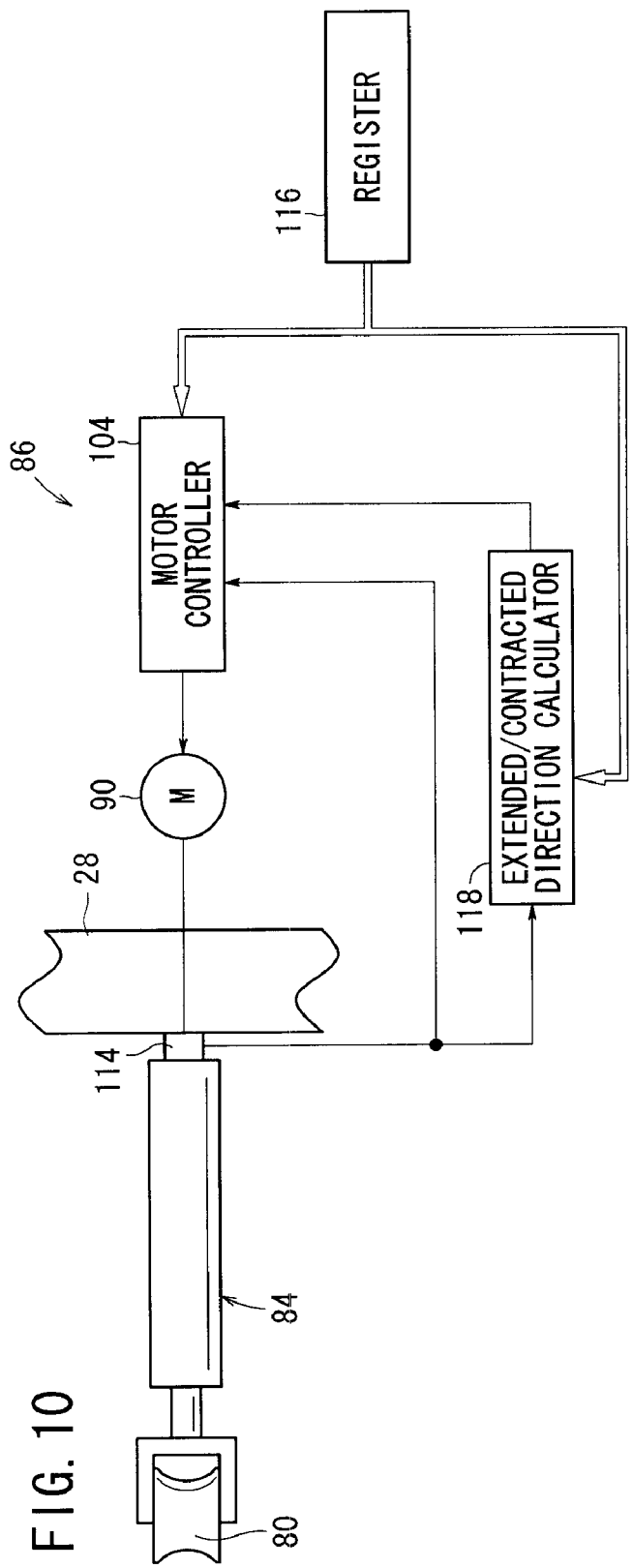
FIG. 10 is a block diagram of a roller controller for controlling the torque of a roller.

The roller controller 86 may perform a position control process (see FIG. 7), a speed control process (see FIG. 9), and a torque control process (see FIG. 10).

Figure 7:
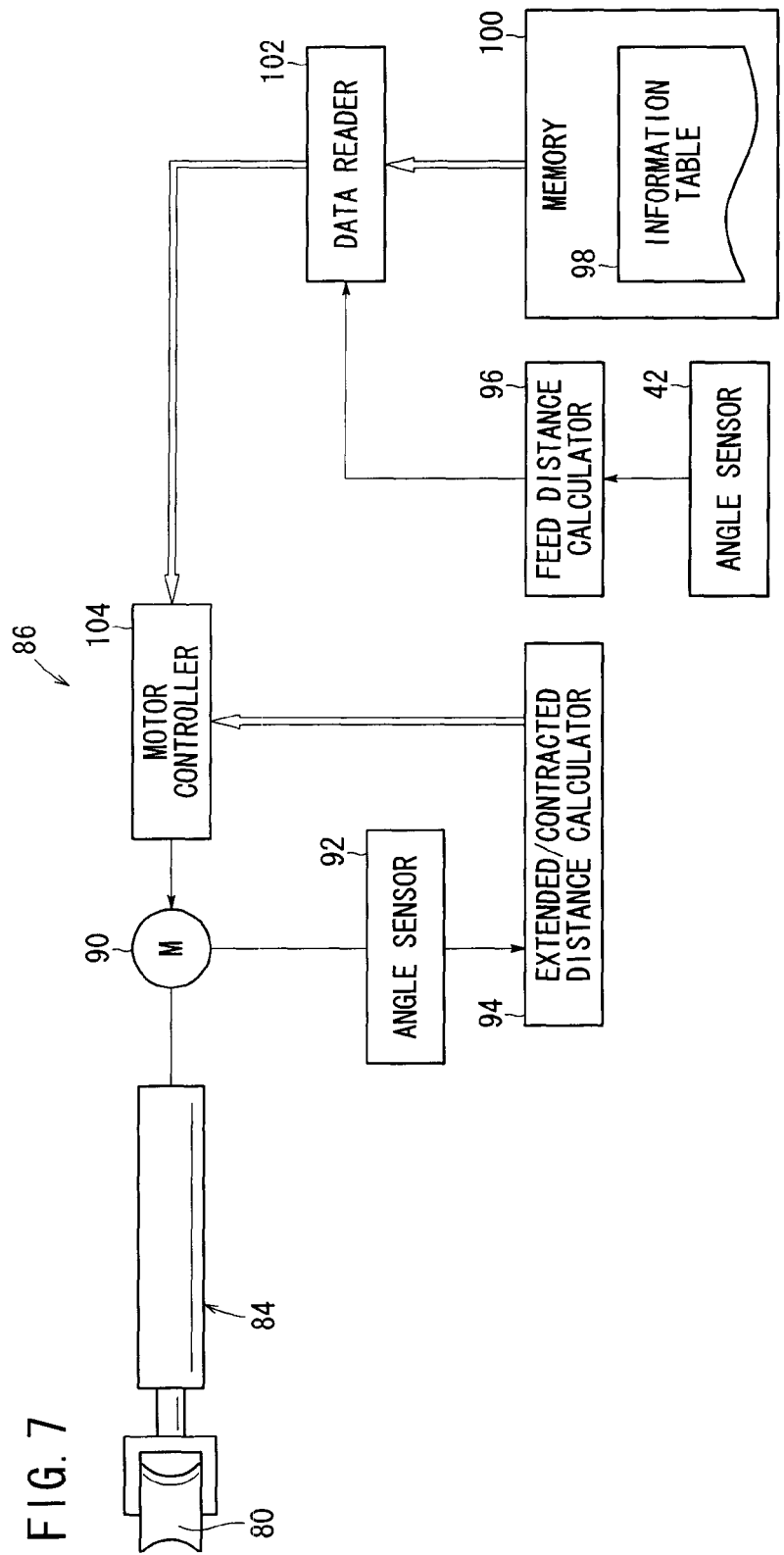
FIG. 7 is a block diagram of a roller controller for controlling the position of a roller.

For performing a position control process using the roller controller 86, if the movable shaft 84 comprises a feed screw mechanism, then, as shown in FIG. 7, the roller controller 86 comprises an angle sensor 92 combined with the movable shaft 84 for detecting an angular displacement of a motor 90 of the feed screw mechanism, an extended/contracted distance calculator 94 for calculating the distance by which the movable shaft 84 is extended or contracted based on a detected signal from the angle sensor 92, a feed distance calculator 96 for calculating a constant distance that the flange section 16 is fed, a memory 100 for storing a first information table 98 containing teaching data with respect to the distance by which the movable shaft 84 is extended or contracted, the teaching data being set and arranged for each constant distance that the flange section 16 is fed, a data reader 102 for reading the teaching data from the first information table 98 in the memory 100 for each constant distance that the flange section 16 is fed, and a motor controller 104 for controlling the motor 90 based on the teaching data read by the data reader 102 and the information concerning the distance by which the movable shaft 84 is extended or contracted, which is calculated by the extended/contracted distance calculator 94.

The feed distance calculator 96 calculates a constant distance by which the flange section 16 is fed, based on a detected signal from the angle sensor 42 (see FIG. 1), which is incorporated in the upper electrode mechanism 26a. The feed distance calculator 96 outputs a pulse signal each time the constant distance is calculated. Based on pulse signals output from the feed distance calculator 96, the data reader 102 cyclically (sequentially) reads the teaching data from the first information table 98. The motor controller 104 controls the motor 90 in order to extend or contract the movable shaft 84, so as to equalize the distance calculated by the extended/contracted distance calculator 94 with the teaching data read from the first information table 98. In this manner, the distance L from the end face 16a of the flange section 16 to the actual welded track B can be made substantially constant.

Figure 8:
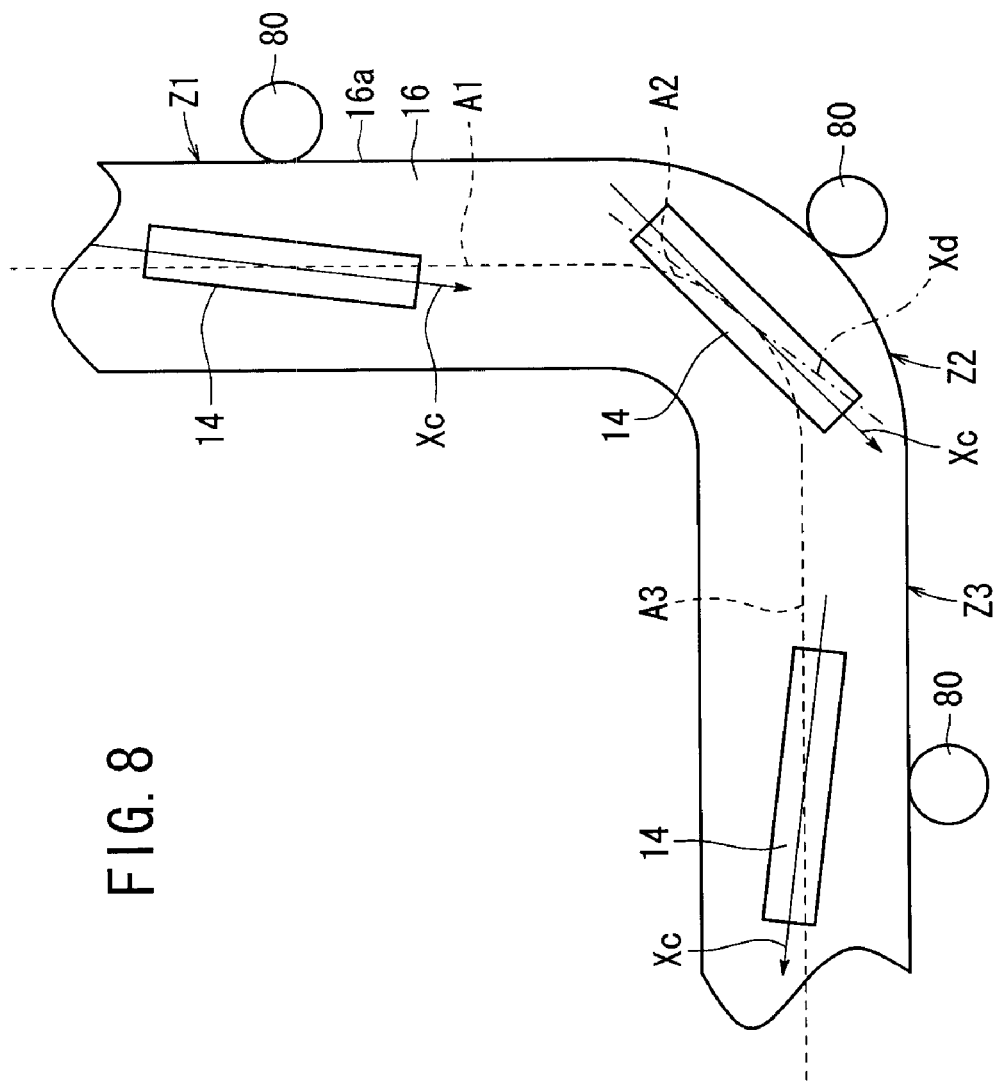
FIG. 8 is a schematic plan view showing the manner in which a first straight portion, a corner, and a second straight portion of a flange section are successively seam-welded.

For example, as shown in FIG. 8, it is assumed that a first straight portion Z1 where the end face 16a of the flange section 16 extends in a straight direction, a corner Z2 where the end face 16a of the flange section 16 is curved, and a second straight portion Z3 where the end face 16a of the flange section 16 extends in a straight direction are successively seam-welded. On the first straight portion Z1, the Xc direction along which the electrode rolls 14 travel is inclined to the direction along which the first straight portion Z1 is welded, i.e., the direction of a straight welding reference line A1 established on the first straight portion Z1. At the same time, the distance that the movable shaft 84 (see FIG. 6) is extended or contracted is controlled based on teaching data established for the first straight portion Z1, in order to bring the distance L from the end face 16a to the actual welded track B (see FIG. 5B) in the first straight portion Z1 of the flange section 16 substantially into conformity with a given distance, which is preset for the first straight portion Z1. The distance L, which is brought into substantial conformity with the distance preset for the first straight portion Z1, refers to a distance that may deviate from the preset distance by a range of 1.5 or smaller for 30. This definition shall apply wherever the distance L is brought substantially into conformity with any preset distance, to be described below.

On the corner Z2, the Xc direction along which the electrode rolls 14 travel is inclined with respect to the direction along which the corner Z2 is welded, i.e., a direction Xd that is tangential to a curved welding reference line A2 established on the corner Z2. At the same time, the distance that the movable shaft 84 is extended or contracted is controlled based on teaching data established for the corner Z2, in order to bring the distance L from the end face 16a to the actual welded track B in the corner Z2 of the flange section 16 substantially into conformity with a given distance that is preset for the corner Z2.

On the second straight portion Z3, as with the first straight portion Z1, the Xc direction along which the electrode rolls 14 travel is inclined with respect to the direction along which the second straight portion Z3 is welded, i.e., the direction of a straight welding reference line A3 established on the second straight portion Z3. At the same time, the distance that the movable shaft 84 is extended or contracted is controlled based on teaching data established for the second straight portion Z3, in order to bring the distance L from the end face 16a to the actual welded track B in the second straight portion Z3 of the flange section 16 substantially into conformity with a given distance that is preset for the second straight portion Z3.

In the above embodiment, the distance L from the end face 16a of the flange section 16 to the actual welded track B is kept substantially in conformity with a preset distance that depends on the shape of the flange section 16. However, the distance L may also be kept in substantial conformity with a constant distance, irrespective of the shape of the flange section 16.

As shown in FIG. 9, in order to perform a speed control process with the roller controller 86, the roller controller 86 comprises the angle sensor 92 combined with the movable shaft 84 for detecting angular displacement of the motor 90 of the feed screw mechanism, the extended/contracted distance calculator 94 for calculating the distance by which the movable shaft 84 is extended or contracted based on a detected signal from the angle sensor 92, a timer 110 for counting reference clock signals and outputting a pulse signal for each constant feed time, a memory 100 for storing a second information table 112, which contains teaching data therein with respect to the distance that the movable shaft 84 is extended or contracted for each constant feed time, the teaching data being set and arranged for each constant feed time, a data reader 102 for reading the teaching data from the second information table 112 in the memory 100 for each constant feed time, and the motor controller 104 for controlling the motor 90 based on the teaching data read by the data reader 102 and the information concerning the distance by which the movable shaft 84 is extended or contracted, as calculated by the extended/contracted distance calculator 94.

Based on pulse signals output from the timer 110, the data reader 102 cyclically (sequentially) reads the teaching data from the second information table 112. The motor controller 104 controls the motor 90 so as to extend or contract the movable shaft 84, in order to equalize the distance calculated by the extended/contracted distance calculator 94 with the teaching data read from the second information table 112. In this manner, the distance L from the end face 16a of the flange section 16 to the actual welded track B can be made substantially constant.

For performing a torque control process using the roller controller 86, as shown in FIG. 10, the roller controller 86 comprises a pressure sensor 114 disposed between the movable shaft 84 and the support 28, for detecting a pressure applied axially to the movable shaft 84, an extended/contracted direction calculator 118 for determining the direction in which the movable shaft 84 is extended or contracted, based on a detected signal from the pressure sensor 114, i.e., a signal that represents the present pressure applied to the movable shaft 84, and a preset constant pressure, i.e., pressure information stored in a register 116, and a motor controller 104 for controlling the motor 90 based on the detected signal from the pressure sensor 114, the pressure information from the register 116, and the information concerning the direction in which the movable shaft 84 is extended or contracted, which is determined by the extended/contracted direction calculator 118.

The motor controller 104 energizes the motor 90 to rotate the rotational shaft in one direction or the other, based on directional information from the extended/contracted direction calculator 118, which is representative of the direction by which the movable shaft 84 is extended or contracted. The motor controller 104 controls the motor 90 in order to extend or contract the movable shaft 84, so as to equalize the pressure, which is represented by the detected signal from the pressure sensor 114, with a preset constant pressure. In this manner, the distance L from the end face 16a of the flange section 16 to the actual welded track B can be made substantially constant.

The seam welding apparatus 10 according to the present embodiment basically is constructed as described above. Next, operations and advantages of the seam welding apparatus 10 will be described below.

In a welding process, the workpiece 12 initially is held by the arm 70 of the robot 50, which includes the workpiece holding jig 72.

When the arm 70 is actuated, the workpiece 12 held thereby can easily be displaced to a desired attitude while the workpiece 12 is fed along the welding reference line A between the electrode rolls 14 (see FIGS. 1 and 4). Under control of the control device 52, movement of the workpiece 12, which is fed by the upper electrode roll 14a and the lower electrode roll 14b rotated respectively by the upper electrode mechanism 26a and the lower electrode mechanism 26b, is synchronized with the movement of the workpiece 12, which is fed by the arm 70. Rotational speeds of the upper electrode mechanism 26a and the lower electrode mechanism 26b are controlled by motor control signals, which are output from the control device 52, for example. The control device 52 is supplied in advance with desired numerical control information corresponding to the welding reference line A, etc. The robot 50 is controlled to perform various actions based on robot control signals output from a robot controller.

Then, the arm 70 is operated in order to cause the flange section 16 of the workpiece 12 to be gripped between the upper electrode roll 14a and the lower electrode roll 14b (see FIG. 6).

The upper electrode roll 14a and the lower electrode roll 14b are spaced a given distance from each other by the upper electrode mechanism 26a and the lower electrode mechanism 26b. Based on a command from the electrode controller 30, the upper electrode drive unit 36a and the lower electrode drive unit 36b displace the first arm member 38a and the second arm member 38b toward each other, thereby gripping the flange section 16 (welding start position) of the workpiece 12 between the upper electrode roll 14a and the lower electrode roll 14b. The upper electrode drive unit 36a and the lower electrode drive unit 36b press the upper electrode roll 14a and the lower electrode roll 14b toward each other, so as to apply a certain pressing force against the flange section 16. The pressing force is applied in the direction of the Z-axis in FIG. 4, i.e., in a direction aligned with the turning center axis O.

Then, the control device 52 controls a power supply device, not shown, to supply electric current to the upper electrode roll 14a and the lower electrode roll 14b, which have gripped the flange section 16 of the workpiece 12. At the same time, the upper electrode roll 14a and the lower electrode roll 14b are rotated to seam-weld the flange section 16 of the workpiece 12 along the welding reference line A (see FIG. 6).

Thus, while the workpiece 12 is seam-welded, the electrode rolls 14 are pressed to bring the leading ends of the electrode rolls 14 closer to the workpiece body 18 with respect to the direction in which the electrode rolls 14 travel, thereby inclining the direction along which the workpiece 12 is fed by the rotating electrode rolls 14 with respect to the direction along which the workpiece 12 is fed by the robot 50. More specifically, as shown in FIG. 5B, the turning mechanism 34 turns the main body 22 about the support post 32 in order to keep the X direction along which the robot 50 feeds the workpiece 12 and the Xe direction along which the rotating electrode rolls 14 feed the workpiece 12 angularly spaced from each other by an angle θ greater than 0° but equal to or smaller than 10°. In addition, the roller controller 86 extends or contracts the movable shaft 84 so as to displace the end face 16a of the flange section 16, against which the roller 80 is held, in the axial direction of the movable shaft 84. Therefore, the distance L from the end face 16a of the flange section 16 to the actual welded track B can easily be changed simply by extending or contracting the movable shaft 84. In other words, by controlling the distance that the movable shaft 84 is extended or contracted, the distance L from the end face 16a of the flange section 16 to the actual welded track B can be made substantially constant.

With the seam welding apparatus 10 according to the present embodiment, since movements of the upper electrode roll 14a and the lower electrode roll 14b in the widthwise direction of the flange section 16 are synchronized with each other by the support 28, the point of contact between the upper electrode roll 14a and the flange section 16, and the point of contact between the lower electrode roll 14b and the flange section 16, are kept in alignment with each other. Hence, the flange section 16 can be reliably welded while the flange section 16 is securely gripped by the upper electrode roll 14a and the lower electrode roll 14b.

Since the turning mechanism 34 presses the electrode rolls 14 toward the workpiece body 18, the welded track B formed by the upper electrode roll 14a and the lower electrode roll 14b does not deviate from the preset welding reference line A. Specifically, the welded track B does not move away from the welding reference line A and toward the end face 16a of the flange section 16. The welded track B also does not become displaced (derailed) from the flange section 16.

The roller 80 is held in abutment against the end face 16a of the flange section 16, and the roller 80 is positionally adjusted by the roller adjusting means 82. Consequently, the distance L from the end face 16a of the flange section 16 to the welded track B can be made substantially constant. In particular, inasmuch as the electrode rolls 14 are pressed toward the workpiece body 18, the end face 16a of the flange section 16 is held in abutment against the roller 80 at all times. Therefore, the present position of the roller 80 can easily be recognized, or in other words, the present position of the roller 80 can easily be regarded as the position of the end face 16a of the flange section 16. It is thus easy for the roller adjusting means 82 to adjust the position of the roller 80. The electrode rolls 14 also are prevented from biting into the workpiece body 18.

With the seam welding apparatus 10 according to the present embodiment, as described above, the distance L from the end face 16a of the flange section 16 to the welded track B that is formed by the electrode rolls 14 can be made substantially constant, depending on straight portions of the flange section 16 where the end face 16a extends straightly, and the corner of the flange section 16 where the end face 16a is curved. It is unnecessary to seam-weld a number of workpieces on a trial basis merely for the purpose of bringing the welded track B into alignment with the welding reference line A. Rather, the workpiece 12 can simply be seam-welded based on teaching data, which have been established geometrically by a three-dimensional CAD system, for example.

Figure 11:
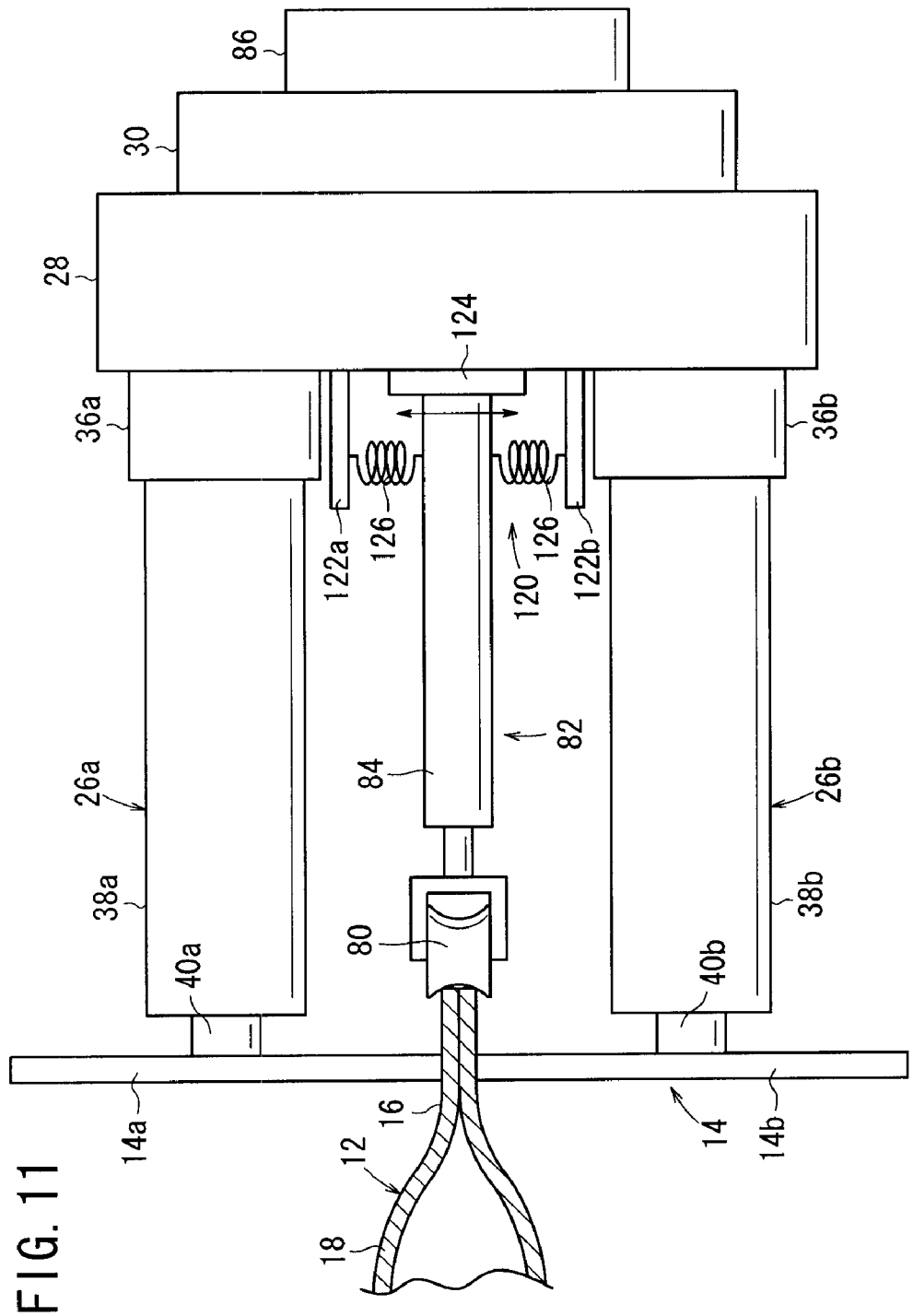
FIG. 11 is a front elevational view, partially omitted from illustration, showing a first modification of a mechanism for holding a movable shaft.
Figure 12:
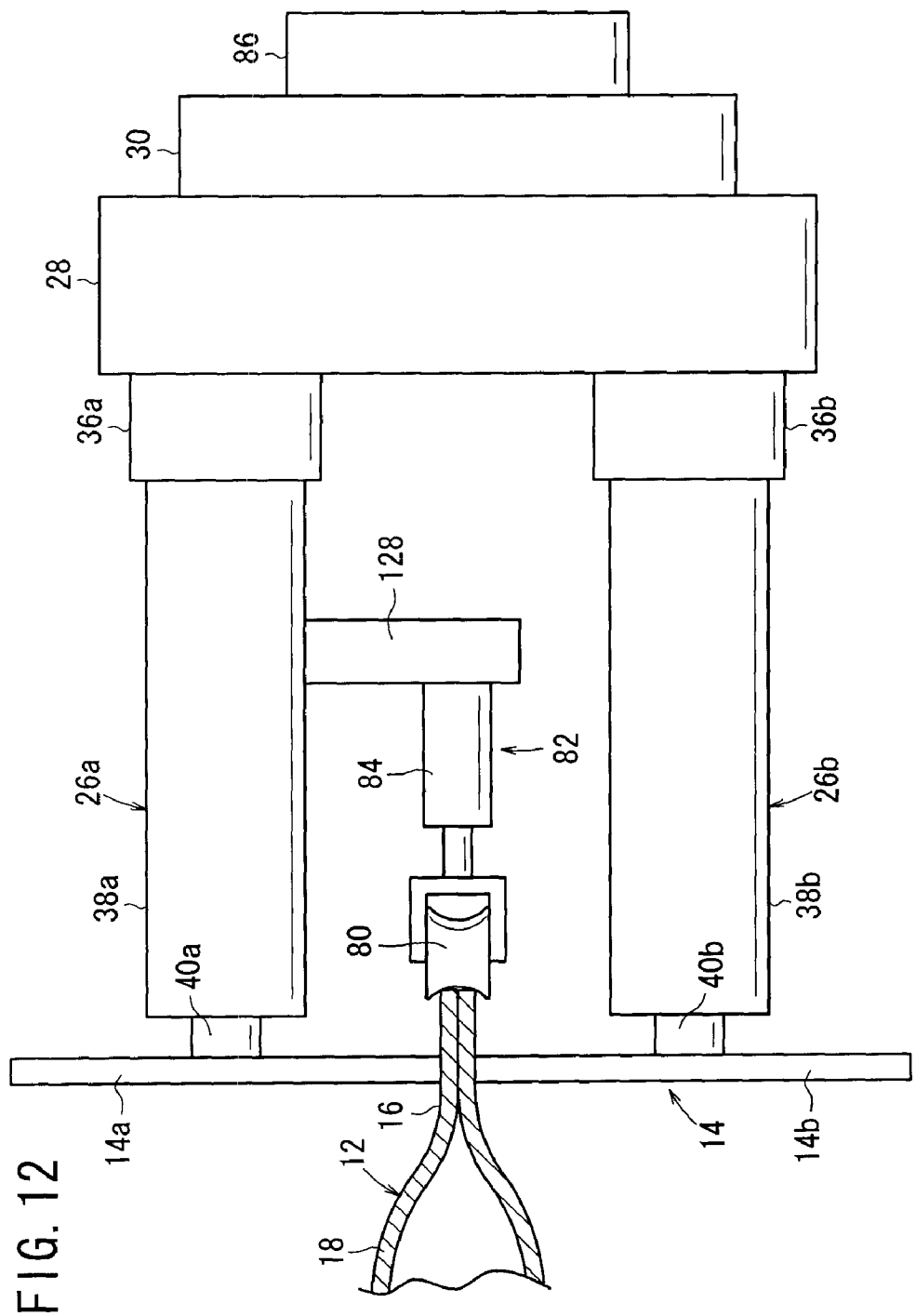
FIG. 12 is a front elevational view, partially omitted from illustration, showing a second modification of a mechanism for holding a movable shaft.

In the above embodiment, the proximal end of the movable shaft 84, which makes up a component of the roller adjusting means 82, is mounted on the support 28. FIG. 11 shows a first modification in which the movable shaft 84 is supported on the support 28 by resilient members 120, and the movable shaft 84 has a vertically movable proximal end. FIG. 12 shows a second modification in which the movable shaft 84 is supported on an arm member disposed between at least one of the electrode rolls 14 (e.g., the upper electrode roll) 14*a* and the support 28.

More specifically, according to the first modification shown in FIG. 11, two horizontal plate members, i.e., a first plate member 122*a* and a second plate member 122*b*, are mounted on a surface of the support 28 that faces toward the electrode rolls 14. Further, a vertical guide rail 124 is mounted on the same surface of the support 28, between the first plate member 122*a* and the second plate member 122*b*. The proximal end of the movable shaft 84 is slidably mounted on the guide rail 124. Springs 126, which serve as resilient members 120, are connected between the first plate member 122*a* and the movable shaft 84, as well as between the second plate member 122*b* and the movable shaft 84.

According to the first modification, even if the flange section 16 has a vertically meandering shape, the roller 80 can follow the vertically meandering shape of the flange section 16 while the flange section 16 is seam-welded. Therefore, the flange section 16, which may be of a complex shape, can be seam-welded satisfactorily.

According to the second modification shown in FIG. 12, a downwardly extending plate 128 is connected to a lower surface of the first arm member 38*a* of the upper electrode mechanism 26*a*, which faces the second arm member 38*b*. Further, the proximal end of the movable shaft 84 is connected to a face of the plate 128, which faces the electrode rolls 14.

According to the second modification, the maximum stroke of the movable shaft 84 can be made small, regardless of the length of the upper electrode mechanism 26*a* from the upper electrode roll 14*a* to the support 28. Therefore, the roller adjusting means 82 can be reduced in size.

The turning mechanism 34 that turns the electrode rolls 14 is not limited to the structural details shown in FIGS. 1 and 3, but may be of any structure, insofar as the turning mechanism 34 is capable of turning the electrode rolls 14 about the weld point Pw.

In the above embodiment, the load cell 76 is used to detect the Y-direction load. However, any arrangement or any type of detector capable of detecting the Y-direction load may be used. Rather than being located between the workpiece holding jig 72 and the flange 74 of the robot 50, the load cell 76 may be located in any position that enables appropriate detection and calculation of the Y-direction load.

Although certain preferred embodiments of the present invention have been shown and described in detail, it should be understood that various changes and modifications may be made to the embodiments without departing from the scope of the invention as set forth in the appended claims.

What is claimed is:

1. A seam welding apparatus for welding a flange section that extends around a workpiece body of a workpiece, comprising:
    two rotary electrodes for gripping the flange section therebetween while seam-welding the flange section;
    a support for synchronizing movements of the two rotary electrodes with each other in a widthwise direction of the flange section;
    electrode pressing means for pressing at least one of the two rotary electrodes toward the workpiece body;
    a roller that abuts against an end face of the flange section; and
    roller adjusting means for positionally adjusting the roller.

2. A seam welding apparatus according to claim 1, wherein the electrode pressing means presses the rotary electrodes to bring leading ends of the rotary electrodes closer to the workpiece body with respect to a direction in which the rotary electrodes travel on the flange section, thereby inclining the direction in which the rotary electrodes travel with respect to a direction along which the flange section is welded.

3. A seam welding apparatus according to claim 2, wherein the direction along which the flange section is welded and the direction in which the rotary electrodes travel are angularly spaced from each other by an angle greater than 0° but equal to or smaller than 10°.

4. A seam welding apparatus according to claim 1, wherein the roller adjusting means comprises:
    a movable shaft mounted on the support, the roller being mounted on a distal end of the movable shaft; and
    a controller for controlling a distance that the movable shaft is extended or contracted.

5. A seam welding apparatus according to claim 1, wherein the roller adjusting means comprises:
    a movable shaft mounted on the support by resilient members, and which is movable along a direction in which the two rotary electrodes are arrayed, the roller being mounted on a distal end of the movable shaft; and
    a controller for controlling a distance that the movable shaft is extended or contracted.

6. A seam welding apparatus according to claim 1, wherein the roller adjusting means comprises:
    a movable shaft supported on an arm member disposed between at least one of the two rotary electrodes and the support, the roller being mounted on a distal end of the movable shaft; and
    a controller for controlling a distance that the movable shaft is extended or contracted.

7. A seam welding method for welding a flange section extending around a workpiece body of a workpiece while the flange section is gripped between two rotary electrodes, the method comprising the steps of:
    synchronizing the two rotary electrodes with each other for movement in a widthwise direction of the flange section; and
    seam-welding the flange section while pressing at least one of the two rotary electrodes toward the workpiece body and holding a roller in abutment against an end face of the flange section.

8. A seam welding method according to claim 7, further comprising the step of pressing the rotary electrodes to bring leading ends of the rotary electrodes closer to the workpiece body with respect to a direction in which the rotary electrodes travel on the flange section, thereby inclining the direction in which the rotary electrodes travel with respect to a direction along which the flange section is welded.

9. A seam welding method according to claim 8, wherein the direction along which the flange section is welded and the direction in which the rotary electrodes travel are angularly spaced from each other by an angle greater than 0° but equal to or smaller than 10°.

* * * * *